Oct. 5, 1965 AKIHIKO SATO ET AL 3,210,623
ELECTRONICALLY-CONDUCTING SEMI-CONDUCTOR DEVICES HAVING A SOLDERED JOINT WITH THE TERMINAL CONDUCTOR OF A POINT CONTACT ELECTRODE THEREOF
Filed Dec. 27, 1960
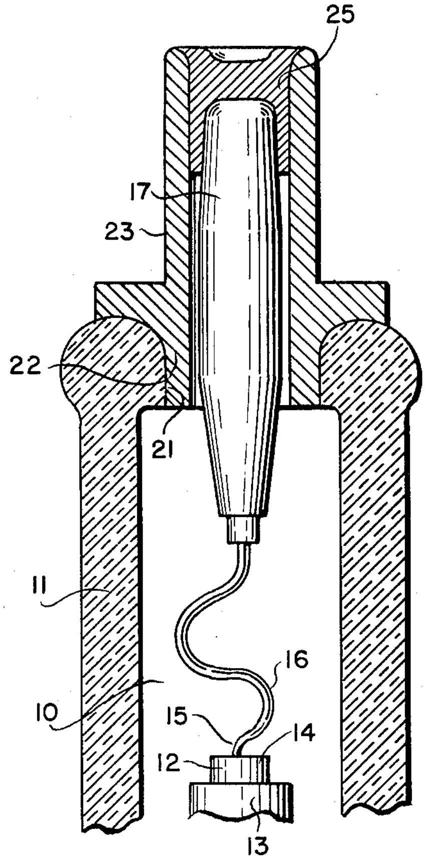
INVENTORS
A. SATO,
K. IKEDA
H. WATANABE
BY Greene, Pineles & Durr
ATTORNEYS.

United States Patent Office 3,210,623
Patented Oct. 5, 1965

3,210,623

ELECTRONICALLY-CONDUCTING SEMI-CONDUCTOR DEVICES HAVING A SOLDERED JOINT WITH THE TERMINAL CONDUCTOR OF A POINT CONTACT ELECTRODE THEREOF

Akihiko Sato, Koichi Ikeda, and Hisashi Watanabe, all of Tokyo, Japan, assignors to Nippon Electric Company, Ltd., Tokyo, Japan Filed Dec. 27, 1960, Ser. No. 78,369
4 Claims. (Cl. 317—236)

This invention relates to semi-conductor devices such as rectifying diodes and transistors, wherein an exposed semi-conductor surface of a semi-conductor body portion is held in engagement with a contact point of at least one point-contact electrode which is maintained at a different potential than the engaged semi-conductor body portion. Such known semi-conductor devices with which the invention is concerned, are described, by way of example, in the article, "The Transistor—a New Semiconductor Amplifier," by Becker and Shive, published in "Electrical Engineering," volume 68, pages 215–223, March 1949, the United States patents of Bardeen 2,524,-033; Benzer et al. 2,646,536; Anderson et al. 2,645,683; Slade 2,641,639; Hollmann 2,639,380; the book, "Crystal Rectifiers" (Radiation Laboratory Series 15), published by McGraw-Hill Company in 1948, the subject of page 369 in connection with FIGS. 1 through 3, and page 370, lines 2 and 3; the book "Transistor Electronics," by Lo et al., published by Prentice-Hall Inc. in 1955, sections 1.113 and 1.114, pages 27–30; and Army Technical Manual, TM–11–690, "Basic Theory and Application of Transistors," published March 1959, sections 2(b) and 2(c), pages 5 and 6. To simplify the explanation of the present invention, it is assumed that all features of and processes used in producing the prior-art semi-conductor devices described in the above-identified publications and patents, are to be considered part of the present disclosure and are applicable to and are embodied in point-contact semi-conductor devices of the present invention, except for the modifications, changes and features of the present invention as hereinafter described.

In highly effective semi-conductor devices having a point-contact electrode held in pressure contact with a surface of a semi-conductor body, the point contact electrode is usually formed of a thin, elastically flexible wire of a metal such as gold, silver, platinum, or their alloys. Such point-contact electrode has to be held insulated from the semi-conductor body engaged thereby, and it is desirable to support it on a metallic terminal conductor which is affixed by solder within an opening of a metallic wall portion of the casing enclosure, so as to maintain the contact point in desired operative engagement with the semi-conductor body surface. The point-contact electrode and the metallic casing portions in which it is held, and the solder with which they are joined or fused, have as a rule, positive coefficients of heat expansion. Accordingly, upon cooling from solder-melting temperature at which the solder joint is formed, all these metallic body members shrink, and in many cases the point-contact electrode frequently breaks its point-contact connection with the surface of the semi-conductor body against which it is to be held pressed. Although this difficulty could be avoided by the use of point-contact electrodes of metals which exhibit greater elasticity than gold, silver or platinum, it has been found that the best results are obtained with point-contact electrodes formed of gold, silver or platinum, or their alloys, which have only relatively low elasticity.

Among the objects of the invention is a semi-conductor device of the foregoing type, having a point-contact electrode held with its contact point in pressure engagement with a surface of a semi-conductor body, wherein the point-contact electrode is formed of a metal having relatively low elasticity, and is joined by solder to the metallic casing support portion, which will nevertheless remain in desired operative, pressure-contact engagement with the semi-conductor surface after the soldering joint between the point-contact electrode and its metallic casing support has been cooled to the hard or rigid normal state.

In accordance with the invention, the metallic casing support is joined to the metallic supporting or terminal conductor of the point-contact electrode of such semi-conductor device—all of which have a positive coefficient of thermal expansion—by a soldered fusion joint formed with a metallic solder composition which causes the soldered joint to expand when it is cooled from molten fusion temperature to the lower normal operating temperature at which the cooled solder joint maintains the point-contact electrode in the desired conductive point-contact connection with the semi-conductor-body surface of the device.

The foregoing and other objects of the invention will be best understood from the following description of an exemplification thereof, reference being had to the accompanying drawing, wherein:

The single figure is a cross-sectional view of a portion of one form of semi-conductor device exemplifying the invention.

As stated before, the invention is applicable to rectifying diodes or transistors wherein an exposed surface of a semi-conductor body is engaged under pressure by one or more point-contact electrodes which are maintained at different potentials relatively to each other and to the semi-conductor body, with all of them suitably held in their operative positions within an enclosure body. A cross-sectional view of a portion of such known semi-conductor device is shown in the single figure hereof. It comprises an enclosure or casing wall 11, a portion of which is shown, which is relatively rigid and encloses and holds in operative position in its interior space 10, all operating elements of the semi-conductor device. The enclosure wall portion 11 shown may consist, for instance, of a glass or ceramic body supporting in any of the known ways in operative position therein, a body portion 12 of semi-conductor material which is joined with a downwardly facing surface (as seen in the drawing) to a conducting body portion 13 suitably held in another portion of the enclosure casing for applying to the surface of the semi-conductor body 12 a predetermined operating potential by a metallic terminal conductor (not shown) which is sealed through an insulating casing. The upwardly-facing semi-conductor surface 14 of the semi-conductor body 12 is engaged with a point contact end 15 of an elongated, elastic, wire-like metallic electrode 16, the outward end of which is held affixed, as by metallic fusing or welding, to the inward end of a much thicker lead-in metallic conductor or terminal 17 held suitably fixed within casing wall portion 11. The elongated point-contact conductor 16 has a certain elasticity, and is elastically bent, for instance, as shown, to hold its pointed contact end 15 under elastic pressure engagement with the facing semi-conductor surface 14.

In the form shown, an opening 21 of the insulating casing portion 11 has joined thereto by a hermetically fused seal, the inward tubular metallic sleeve portion 22 of a metallic terminal sleeve 23. In the form shown, the interior surface of the outward upper end of the metallic terminal sleeve and the surrounded surface of the outer end of the metallic lead-in support conductor 17 are hermetically joined and fused to each other by a solidified layer of metallic solder which fills the space separating the outer end of the metallic lead-in and supporting wire 17 and the surrounding end portion of metallic sleeve 23. The fused hermetic seal between the downward end surface 22 of terminal sleeve 23 and the facing wall portion of insulating casing opening 21, may be formed by any of the known techniques for making hermetic or vacuum-tight seals between facing glass and metal surfaces, for instance, as described in Pask et al. Patent 2,560,593, or between ceramic and metallic surfaces as described, for instance, in Marsden et al. Patent 2,897,394, or Polese Patent 2,880,349.

The metallic terminal sleeve 23 and the point-contact-carrying metallic terminal wire 16, and their junction solder layer 25, have heretofore been formed of metals having a positive thermal coefficient of expansion, and their length or dimensions increase when they are heated to the temperature at which the applied solder metal 25 is melted for fusing them to each other. As a result, following the completion of the soldering operation, these elongated metallic members will contract and shrink in length, and in many cases such longitudinal metal-part shrinkage causes lifting of the point-contact electrode 16 from its operative conductive engagement with the semi-conductor surface 14 of semi-conductor layer 12. As an example, with the terminal wire 17 of brass 10 millimeters long, and the point contact electrode 16 of silver 3 millimeters long, and the solder metal of the soldering joint 25 heated to 300° C. for forming the soldered fusion joint 25 to the metallic terminal sleeve 23 after the heating operation and upon cooling the length of the terminal member 17 will shrink about 0.06 mm., and of the point-conductor 16, 0.017 mm., resulting in a shrinkage of 0.077 mm. in their total length. In many cases, such shrinkage of conductor members 16 and 17 and the solidification of the molten solder junction 25, causes the contact point end 15 of the pointed conductor wire 16 to be raised from the facing semi-conductor surface 14, thereby breaking its current-conducting relation therewith.

By using a highly elastic material for the pointed conductor wire 16, it might be possible to solve this difficulty, by placing the laterally bent loops of pointed conductor 16 under initially greater elastic deformation when joining its lead-in wire 17 by the soldering junction 25 to the surrounding terminal sleeve 23. However, to obtain the desired operating characteristics for a semi-conductor diode or in general, to a semi-conductor device having the required operating characteristics, the point-contact electrode wire 16 has to be formed of metals having certain special characteristics, and this requires in most cases, the use of either gold, silver or platinum, or their alloys, for the point contact conductor 16, and these metals have relatively poor or low elasticity and cannot by subjected to excessive initial deformation without deforming them beyond their elastic limit.

In accordance with the invention, the above-described difficulties encountered with soldered joints 25 between the elongated metallic supports of the metallic point-contact electrode of a semi-conductor device, are overcome by forming the solder joint 25 with a solder metal which expands when and after it is cooled and solidified from its molten state to a solid state for providing a fixed, fused soldered junction 25 between the elongated lead-in or support wire 17 of the point-contact electrode wire 16 and the surrounding metallic terminal sleeve 23. Since such solder metal expands when and after it solidifies, the tubular fusion joint 25 formed therewith will push the lead-in and support wire 17 in inward direction (as seen), and increase the pressure exerted by the pointed end 15 of its elongated point-contact electrode 16, and assure a positive or firm contact with the facing semi-conductor surface of semi-conductor layer 12. Since both metallic terminal sleeve 23 and soldered fusion joint 25 are constructionally exposed to air, the joint 25 as well as sleeve 23 is then cooled after it has been heated during soldering operation and hence, solidifies. This is followed by cooling of both terminal wire 17 and contact electrode with some delay in time. Therefore, the lead-in wire is pushed in an inward direction. In choosing the solder, the thermal coefficient of expansion of the point-contact conductor 16 and its lead-in support wire 17, must be taken into consideration, so that on cooling, their shrinkage shall be compensated for by the expansion of the tubular soldering junction layer 25 extending between the facing lateral surfaces of lead-in conductor 17 and the surrounding surface of terminal sleeve 23. As an example, when using a point-contact conductor wire 16 of silver 3 mm. long, and a lead-in wire 17 of brass 10 mm. long, the shrinkage of the conductors 16 and 17 when rigidifying the molten solder layer 25, is compensated for by the expansion of a tubular solder layer 25 formed of an alloy of Bi, Pb, Sn, in the following proportions expressed in percentage of their weight:

| | Percent |
|---|---|
| Bi (bismuth) | 46 |
| Pb (lead) | 20 |
| Sn (tin) | 34 |

This solder composition has a linear expansion rate of (L.E.R.) of 0.05% after 60 minutes. This solder is made by Senju Kinzoku Kogyo Kabushiki-Kaisha (Senju Metal Company), 23, Hashido Senju, Adachi-ku, Tokyo, Japan.

Without thereby limiting the scope of the invention, there are given below further examples of combinations of different metals which have a negative linear coefficient of thermal expansion for solders containing a predetermined quantity of bismuth and having the property of expansion during and after solidification (L.C.T.E.).

*Metal composition 2*

52.5% of Bi
15.5% of Sn
32% of Pb
0.05% L.E.R.

This is made by above-mentioned Senju Kinzoku, Kogyo Kabushiki-Kaisha [Senju Metal Company] 23 Hashedo, Senju Adachi-ku, Tokyo, Japan.

*Metal composition 3*

50% of Bi
20% of Sn
30% of Pb
L.C.T.E.

The characters of expansion after the soldering operation and upon cooling are mainly dependent upon the content of bismuth. According to our experience the content of bismuth required is more than 45% by weight to obtain the desired result.

It will be apparent to those skilled in the art that the novel principles of the invention disclosed herein in connection with a specific exemplification thereof, will suggest other modifications and applications of the same. It is accordingly desired that in construing the breadth of the appended claims, they shall not be limited to the specific exemplification of the invention described herein.

We claim:

1. In a semi-conductor device, a semi-conductor body portion having an exposed semi-conductor surface; an elongated metallic electrode having a contact point at a first end thereof in point contact with said exposed semi-conductor surface; an insulating casing having a hollow interior for receiving said semi-conductor body portion and said metallic electrode; said casing having an opening at one end thereof; a metallic support conductor having a first end extending into said opening and electrically joined to the second end of said metallic electrode; an elongated hollow metallic sleeve; a first end of said sleeve being joined to said insulating casing within said one opening; the second end of said support conductor extending into said hollow sleeve; metallic solder electrically joining the second end of said support conductor to the interior of said hollow sleeve near the second end thereof; said elongated metallic electrode being in alignment with said support conductor and said metallic sleeve; said metallic solder being placed in said hollow sleeve to completely seal the second end of said sleeve; said metallic solder being comprised of a metallic composition having a negative coefficient of expansion such as to expand upon cooling thereof for urging said support conductor and said metallic electrode toward said semi-conductor surface.

2. In an electronically conducting semi-conductor device as claimed in claim 1, the metal of said elongated metallic electrode being selected from the group consisting of gold, silver and platinum.

3. In an electronically conducting semi-conductor device as claimed in claim 2, the solder metal of said joint consisting of an alloy of Bi (bismuth), Pb (lead) and Sn (tin).

4. In an electronically conducting semi-conductor device as claimed in claim 3, the solder metal of said joint consisting of an alloy that contains bismuth of approximately 45% by weight.

References Cited by the Examiner

UNITED STATES PATENTS

| | | | |
|---|---|---|---|
| 2,697,805 | 12/54 | Collins | 317—236 |
| 2,815,474 | 12/57 | Lewis et al. | 317—236 |
| 2,825,015 | 2/58 | Stineman et al. | 317—236 |
| 2,948,050 | 8/60 | Vessem et al. | 29—25.3 |
| 2,987,658 | 6/61 | Messenger et al. | 317—234 |

OTHER REFERENCES

Publication "Steel" of Feb. 26, 1945; pages 87 and 88 of the article entitled "Tin-Free and Low-Tin Solders" by Reichelderfer and Gouser.

DAVID J. GALVIN, *Primary Examiner.*

SAMUEL BERNSTEIN, GEORGE N. WESTBY, *Examiners.*